United States Patent [19]

Fujikane

[11] Patent Number: 5,604,621
[45] Date of Patent: Feb. 18, 1997

[54] SCANNER MOTOR

[75] Inventor: Masau Fujikane, Kanagawa, Japan

[73] Assignee: Fuji Xerox Co., Ltd., Tokyo, Japan

[21] Appl. No.: 411,998

[22] Filed: Mar. 28, 1995

[30] Foreign Application Priority Data

May 31, 1994 [JP] Japan .................................. 6-139610

[51] Int. Cl.$^6$ .................................................. G02B 26/08
[52] U.S. Cl. ......................... 359/200; 359/198; 359/216; 384/372
[58] Field of Search ..................... 359/198, 200, 359/212, 216–219; 310/90, 90.5; 384/372–378, 129, 132–135; 464/170, 179

[56] References Cited

U.S. PATENT DOCUMENTS

| | | | |
|---|---|---|---|
| 4,805,972 | 2/1989 | Tanaka et al. | 359/200 |
| 5,108,198 | 4/1992 | Nii et al. | 384/133 |

FOREIGN PATENT DOCUMENTS 4-120919  10/1992  Japan .

*Primary Examiner*—James Phan
*Attorney, Agent, or Firm*— Finnegan, Henderson, Farabow, Garrett & Dunner, L.L.P.

[57] ABSTRACT

An inner fixed shaft of a scanner motor is secured to a housing by a screw. A rotary polygon mirror is attached to the inner fixed shaft through bearings of a cylindrical portion. A spiral-shaped rib or groove is formed on the housing at least on the lower side of the rotary polygon mirror. When the rotary polygon mirror is rotated, an air current is generated in accordance with the rotation of the rotary polygon mirror. This current becomes an air current flowing toward a base portion of the inner fixed shaft of the scanner motor to prevent an oil component dispersed or volatilized from the bearing portion from being moved toward the rotary polygon mirror and the direction of optical devices disposed around the rotary polygon mirror. Moreover, it is possible to alleviate a wind noise generated from the rotary polygon mirror.

8 Claims, 2 Drawing Sheets

SCANNER MOTOR

BACKGROUND OF THE INVENTION

The present invention relates to a scanner motor and, more particularly to a scanner motor having a rotary polygon mirror rotating at high speed for use with an image forming apparatus, such as a laser beam printer or the like.

Conventional scanner motors of this kind are roughly classified as scanner motors using a ball bearing for a bearing portion and scanner motors using a fluid bearing for a bearing. There is a demand that these scanner motors can be operated at a higher speed and at a larger load as the image forming apparatus, such as the laser beam printer or the like, are operated at a high speed and a picture quality becomes high in resolution.

A bearing using a ball bearing is simple in arrangement and easy to assemble and control as compared with the fluid bearing and therefore its application range is widespread in the high speed and large load bearings. On the other hand, the fluid bearing needs parts of high accuracy and also needs an assembly circumstances in which an air is kept clean. Therefore, an oil SGB using an oil as a fluid receives a remarkable attention instead of an air bearing.

However, when the ball bearing or the oil SGB is effectively used in the bearing portion, it is frequently observed that a oil component is dispersed and volatilized from the bearing portion when the motor is rotated so that the oil component is overflowed to the outside of the motor to smudge a reflection surface of the rotary polygon mirror or optical devices disposed around the rotary polygon mirror. If the optical surface of the rotary polygon mirror is smudged by the oil component as described above, there is then the problem that an intensity of light is lowered to make an output image uneven in light and shape or that noise light is formed around a laser beam spot by scattered light, thereby a picture quality being deteriorated considerably.

Therefore, to solve this problem, there is proposed a technique which is disclosed in Japanese laid-open utility model publication No. 4-120919, for example. FIG. 4 shows a cross-sectional view of a scanner motor. Reference numeral 31 designates a bracket, 32 an electromagnet on the stator side, 35 a rotary shaft supported by upper and lower ball bearing supporting portions, 36 a permanent magnet on the rotor side, and 37 a rotary polygon mirror. According to this prior art, in order to prevent an oil component from being overflowed to the outside when the oil component is dispersed from or volatilized from the ball bearing supporting portion, the bracket 31 is provided with a concave portion 31a on which a rib portion 31b is formed. This rib portion 31b generates an air current flowing to the upper bearing supporting portion when the rotary shaft 35 is rotated in the direction shown by an arrow A. As a result, the oil component from the bearing supporting portion can be prevented from being dispersed or volatilized, thereby making it possible to prevent the rotary polygon mirror 37 from being smudged by the oil component. FIG. 5 shows a perspective view of the bracket 31 in which reference numeral 31c depicts a through-hole.

However, the above-mentioned prior art encountered with the problem that, when the rib portion 31b is exposed to wind generated by the rotation of the rotary polygon mirror 37, a large noise is generated by a resulting impulse.

SUMMARY OF THE INVENTION

An object of the present invention is to provide a scanner motor in which the problems of the prior art can be eliminated and in which the oil component dispersed or volatilized from the bearing portion can be prevented from being moved to the rotary polygon mirror and the direction of the optical devices disposed around the rotary polygon mirror without increasing a noise.

To attain the above-mentioned object, according to a first aspect of the present invention, there is provided a scanner motor having a rotary polygon mirror rotating at a high speed in which a spiral-shaped rib or groove is formed on a housing of a scanner motor at least on the lower side of the rotary polygon mirror to generate from an air current generated in accordance with a rotation of the rotary polygon mirror a forced air current flowing to a base portion of an inner fixed shaft of the scanner motor.

According to a second aspect of the present invention, the scanner motor is characterized in that a height of the spiral-shaped rib is increased in the outside.

According to a third aspect of the present invention, the scanner motor is characterized in that an outside of the spiral-shaped rib is opened or closed.

According to the first aspect of the present invention, at least a part of the air current generated when the rotary polygon mirror is rotated is forced to be converted to a air current flowing toward the base portion of the inner fixed shaft of the scanner motor. As a consequence, the oil component on the bearing supporting portion can be prevented from being dispersed or volatilized and it is possible to prevent the rotary polygon mirror from being smudged by the oil component. Moreover, it is possible to reduce a wind noise generated when the rotary polygon mirror is rotated.

According to the second aspect of the present invention, the oil component on the bearing supporting portion can be prevented from being scattered or volatilized and it is possible to reduce the above-mentioned wind noise more effectively.

According to the third aspect of the present invention, the oil component on the bearing supporting portion can be prevented from being scattered or volatilized and it is possible to reduce the above-mentioned wind noise more effectively.

DETAILED DESCRIPTION OF THE PREFERRED EMBODIMENTS

Figure 1:
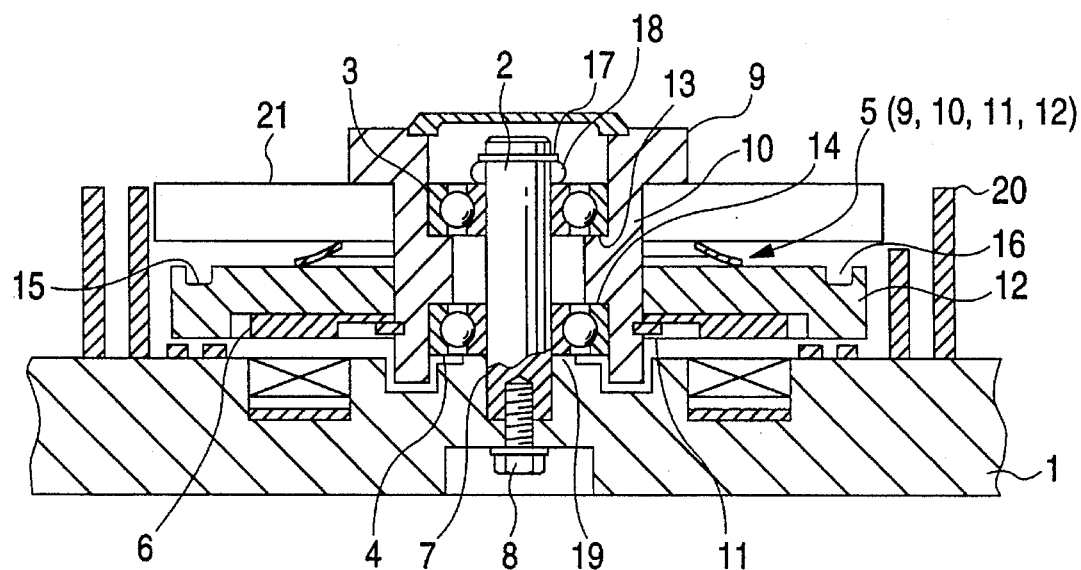
FIG. 1 is a cross-sectional view of a scanner motor according to an embodiment of the present invention.

The present invention will hereinafter be described below in detail with reference to the drawings. FIG. 1 shows a cross-sectional view of a scanner motor according to an embodiment of the present invention.

This motor is a motor of an outer rotor type. This motor is fundamentally composed of an inner fixed shaft 2 attached to a motor housing 1 and a rotational force generating mean 6 for giving a rotational force to an outer rotor 5 pivotally supported to the inner fixed shaft 2 through a pair of upper and lower bearings 3, 4.

The inner fixed shaft 2 is secured to an attachment portion 7 of the housing 1 by a screw 8. The above-mentioned outer rotor 5 is composed of a cylindrical portion 10 with which a projected flange portion 9 is integrally formed so as to project outwardly in the peripheral edge of the vertex thereof and a doughnut-shaped rotor yoke 12 fitted into the lower portion side of the cylindrical portion 10 and which is properly positioned by a retaining ring 11. The cylindrical portion 10 has accommodating stepped portions 13, 14 formed on its inner peripheral wall to accommodate the bearings 3. 4.

The above-mentioned rotor yoke 12 has a balancer attachment groove 15 defined around its upper surface, and a balancer 16 is attached to the proper position of the above-mentioned attachment groove 15. Thus, the rotor yoke 12 can be rotated stably. The upper bearing 3 is properly positioned by a pre-load spring 18 engaged with the inner fixed shaft 2 by a retaining ring 17 when the lower surface thereof is brought in contact with the bottom portion of the above-mentioned accommodating stepped portion and the upper surface thereof is pressed by the pre-load spring 18. On the other hand, the above-mentioned attachment portion 17 has a positioning projection portion 19 of the lower bearing 4 formed thereon. The lower bearing 4 is properly positioned when the lower surface thereof is brought in contact with the above-mentioned positioning projection portion 19 and the upper surface thereof is brought in contact with the vertex portion of the accommodating stepped portion 14.

According to this embodiment, a spiral-shaped rib 20 is provided on the lower side of the rotor yoke 12 and outside of the rotor yoke 12 and the rotary polygon mirror 21. According to the present invention, however, it is sufficient that the spiral-shaped rib 20 is disposed on the lower side of at least the rotor yoke 12 and that the spiral-shaped rib 20 need not always be provided on the outside of the rotor yoke 12. Moreover, a spiral-shaped groove may be formed on the housing 1 instead of the spiral-shaped rib 20.

Figure 2:
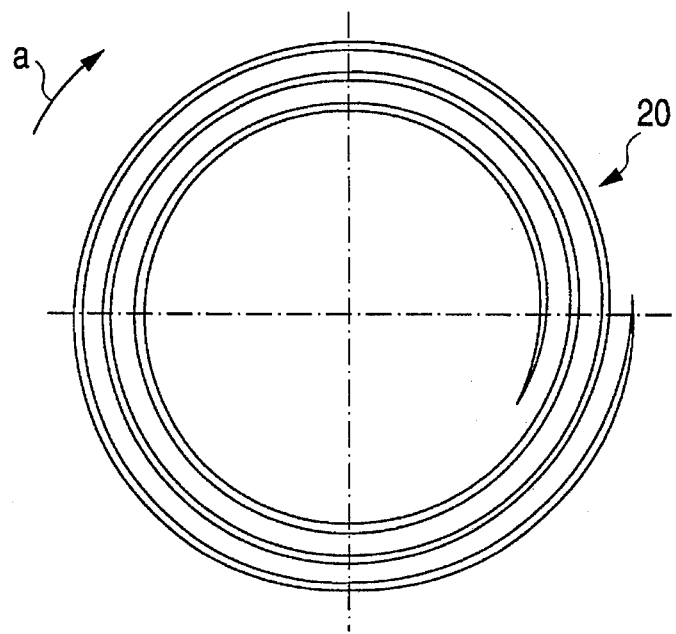
FIG. 2 is a plan view showing an example of a spiral-shaped rib.

FIG. 2 is a plan view of the above-mentioned spiral-shaped rib 20 or groove. A spiral direction of the spiral-shaped rib 20 or groove is made opposite to a rotating direction a of the rotary polygon mirror 21. Owing to the action of the spiral-shaped rib 20 or groove, it is possible to generate wind or air current flowing toward the lower bearing 4 from wind generated when the rotary polygon mirror 21 is rotated. As a result, the oil component dispersed from the lower bearing 4 can be prevented from being scattered to the periphery of the lower bearing 4. Moreover, a part of wind generated when the rotary polygon mirror is rotated is advanced to the inside along the spiral-shaped rib 20 or groove and also is escaped to the upper portion of the rib 20 or the groove, thereby making it possible to alleviate a wind noise.

Figure 3:
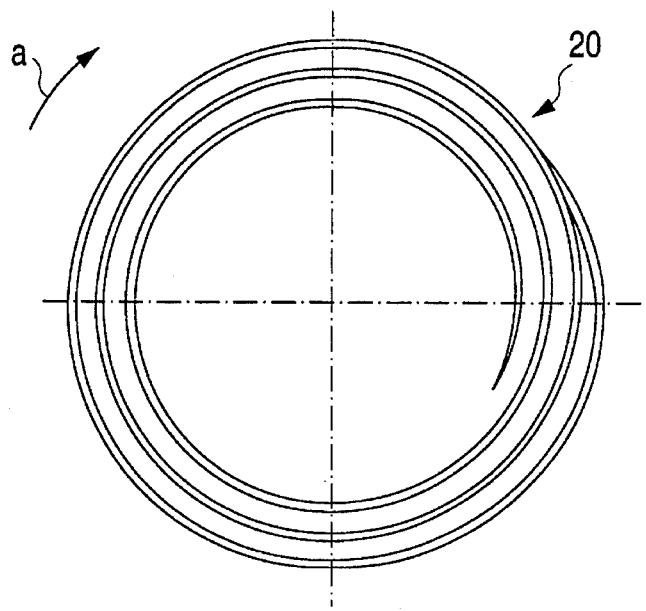
FIG. 3 is a plan view showing another example of a spiral-shaped rib.
Figure 4:
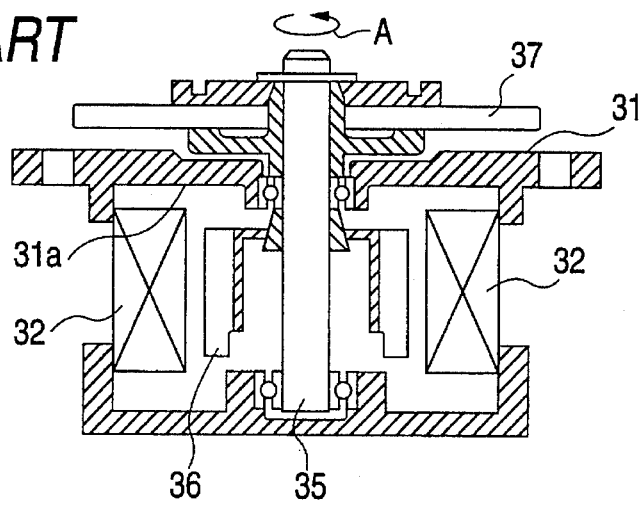
FIG. 4 is a cross-sectional view showing an example of a conventional scanner motor.
Figure 5:
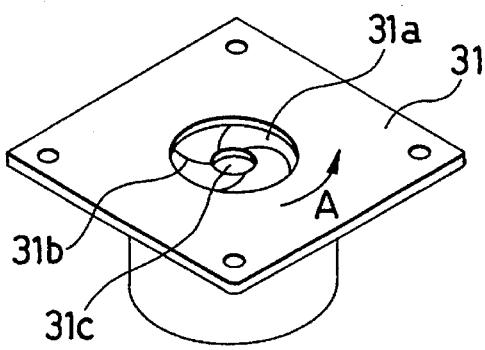
FIG. 5 is a perspective view showing a bracket in FIG. 4.

If the end portion of the rib 20 is shaped such that its height is progressively increased in the outside, then it becomes possible to alleviate a wind noise considerably. Moreover, the spiral-shaped rib 20 or groove may be shaped such that the end portion thereof is closed as shown in FIG. 3.

While the present invention is applied to the scanner motor in which the central shaft is fixed as described above, the present invention is not limited thereto and can of course be applied to a scanner motor in which the central shaft can be rotated.

According to the first aspect of the present invention, a part of air current generated when the rotary polygon mirror is rotated can be forced to be converted to the air current flowing to the inner fixed shaft of the scanner motor. As a result, it is possible to prevent the oil component on the bearing supporting portion from being dispersed or volatilized. Moreover, it is possible to alleviate a wind noise generated when the rotary polygon mirror is rotated.

According to the second and third aspects of the present invention, it is possible to prevent the oil component on the bearing supporting portion from being dispersed or volatilized. Also, it is possible to alleviate the wind noise generated in accordance with the rotation of the rotary polygon mirror more effectively.

What is claimed is:

1. A scanner motor, comprising:

a housing having an outwardly extending spiral-shaped rib;

an inner fixed shaft having a base portion, said inner fixed shaft being attached to said housing centrally of said spiral shaped rib; and a polygon mirror having a lower side and an upper side, said polygon mirror being rotatable about said inner fixed shaft at a high speed;

the spiral-shaped rib being formed on said housing to underlie at least the lower side of said polygon mirror such that a forced air current is generated and flows toward the base portion of said inner fixed shaft when said polygon mirror rotates.

2. The scanner motor of claim 1, wherein said spiral-shaped rib has a height which increases as said spiral-shaped rib extends outwardly.

3. The scanner motor of claim 1, wherein said spiral-shaped rib has an open outer end opened.

4. The scanner motor of claim 1, wherein said spiral-shaped rib has a closed outer end.

5. A scanner motor, comprising:

a housing having an outwardly extending spiral-shaped groove;

an inner fixed shaft having a base portion, said inner fixed shaft being attached to said housing; and a polygon mirror having a lower side and an upper side, said polygon mirror being rotatable about said inner fixed shaft at a high speed;

the spiral-shaped groove having formed in said housing to underlie at least the lower side of said polygon mirror such that a forced air current is generated and flows toward the base portion of said inner fixed shaft when said polygon mirror rotates.

6. The scanner motor of claim 5, wherein said spiral-shaped groove has a depth which increases as said spiral-shaped groove extends outwardly.

7. The scanner motor of claim 5, wherein said spiral-shaped groove has an open outer end.

8. The scanner motor of claim 5, wherein said spiral-shaped groove has a closed outer end.

\* \* \* \* \*